United States Patent Office 3,475,697
Patented Oct. 28, 1969

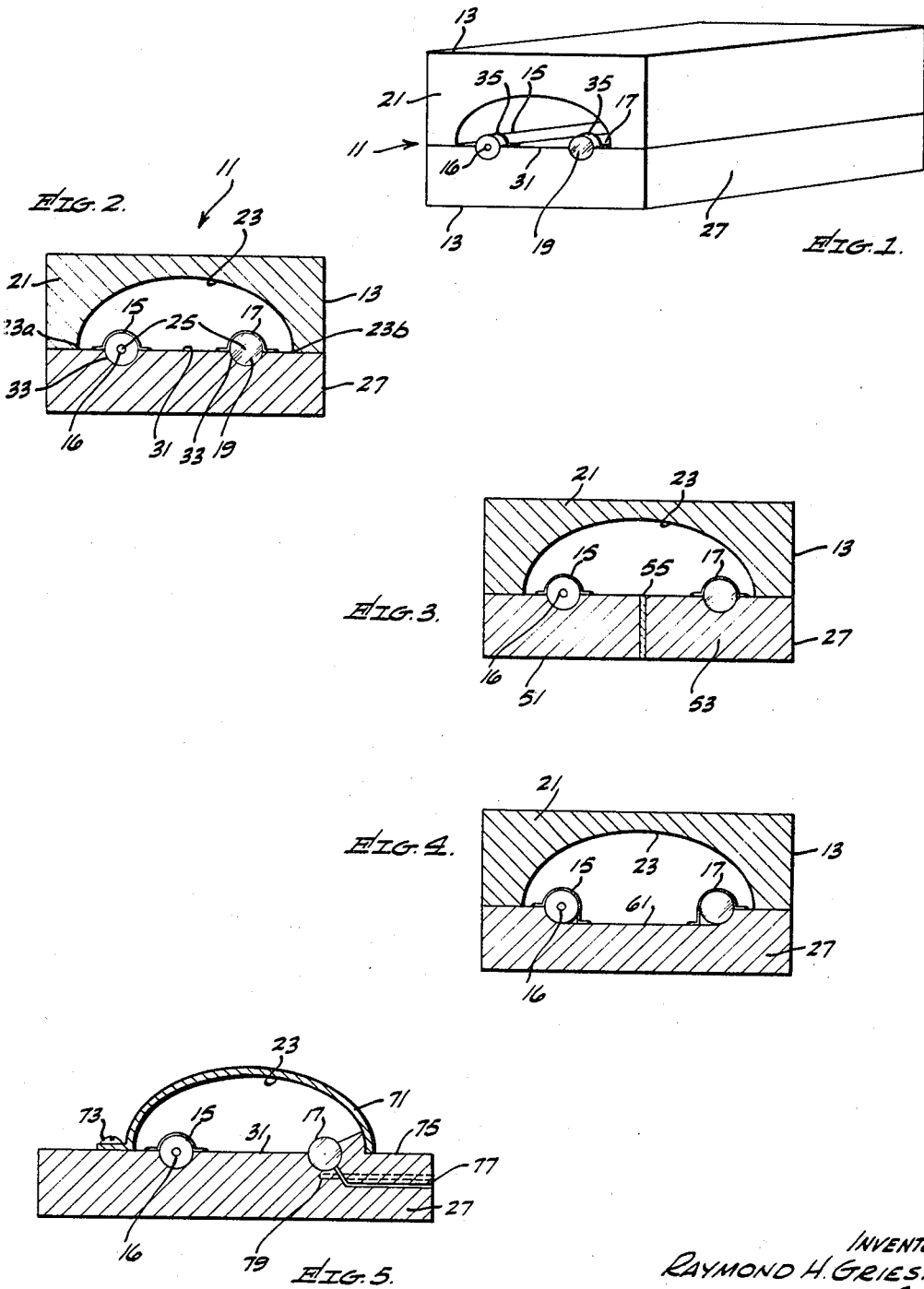

3,475,697
LASER EMPLOYING SEMIELLIPTICAL PUMP CAVITY
Raymond Howard Griest, Los Angeles, Calif., assignor to Hughes Aircraft Company, Culver City, Calif., a corporation of Delaware
Filed Apr. 26, 1966, Ser. No. 545,438
Int. Cl. H01s 3/09
U.S. Cl. 331—94.5           10 Claims

ABSTRACT OF THE DISCLOSURE

A laser utilizing a pump cavity structure with a first section having a highly specularly reflective semielliptical surface defining two parallel focal lines, and a second section having high thermal conducting characteristics enclosing the semielliptical surface in the plane of the major axis thereof and having an inner surface adapted to receive in thermal contact a linear pumping lamp and a solid-state active laser rod, each positioned coaxially with respect to different ones of the focal lines.

---

In order to produce laser action in an active laser element, a certain minimum pump energy must be supplied per unit volume of the solid laserable material and it must be supplied above a minimum rate sufficient to overcome spontaneous decay. However, the energy absorbed in the solid material is only a small fraction of the radiative output of the pump generator, such as a xenon gas lamp. This is due to the fact that a certain amount of the pump energy will not reach the solid laseable material because not all of this energy can be directed into the material and, of that amount which does, only radiative energy in the proper absorption region for the particular material used is effective in providing the excitation necessary for laser action. The energy not utilized in excitation of the laseable material takes the form of heat which, if not directed away from the material, will cause the laser action to deteriorate and to eventually cease. This heat barrier of the active laser element has been fully discussed in connection with ruby in an article entitled "Effects of Elevated Temperatures on the Fluorescence and Optical Maser Action of Ruby," by James P. Wittke, published in the Journal of Applied Physics, vol. 33, No. 7, July 1962, and is applicable to other laseable material.

In the area of Q switching lasers, such as used in laser range finders, for example, it has been found vital for efficient laser operation to regulate the temperature of a ruby laser element, for example, to the range of about 30°±10° C. for optimum energy output and fast repetitive firing rate. At lower temperatures the control of laser pulses becomes difficult and at elevated temperatures the intensity of the emitted beam falls off considerably and eventually, as noted above, laser action will cease.

In attempting to overcome this problem, scientists have utilized various techniques such as forced air and liquid cooling. However, it has been found that in the case of air cooling, for example, that it is an extremely inefficient coolant and that there is a tendency for the polished interior of the pump cavity surrounding the pump lamp and the laseable material to tarnish and thus become less efficient in directing the pump energy to the active laser element. Furthermore, for airborne laser systems this method is cumbersome and inefficient since the air must be supplied by some kind of mechanical refrigeration equipment. Small mechanical refrigerators are expensive, have limited life, tend to be heavy, and occupy excessive space. The air supplied by such a cooling system must be conducted through flexible tubing and pressure drops and thermal losses along the way must be contended with.

Also, a prime difficulty with the air system is the problem of regulating the temperature from the cooling to the heating mode. In the case of a liquid coolant, generally the liquid is forced (by means of a heavy and bulky pump) to circulate through glass jackets placed in the pump cavity. The jackets caused blocking of the pump light and deteriorated the focusing properties of the pumping geometry through optical distortion. In addition, this imposed some limitations on the choice of the cavity dimensions, thus limiting the flexibility of the design.

Another approach in an attempt to solve this problem has been in the design of the laser pump cavity configuration under the theory that if a substantial portion of the optical pump energy can be directed or focused on the active laser element in the form of a rod, less pump energy will be wasted in directly heating the pump cavity. One example of this is the use of an elliptical pump cavity configuration wherein the pump lamp lies along one of the focal lines of the elliptical cylinder and the active laser element in the form of a rod lies along the other focal line. This configuration provides good focusing characteristics but results in a large air space between the laser rod and the cavity inner wall. When this laser is operated at a high repetition rate, the laser element becomes extremely hot and soon stops lasing since there is a very poor thermal path to conduct the heat away from the laser rod.

Another example of this approach was the placing of the pump flash lamp and the ruby rod in close proximity to each other, surrounded by such materials as aluminum foil or magnesium oxide. This arrangement is called "close coupling." The efficiency was found to be fairly good, but not as efficient as the elliptical cavity. Also, this technique did not supply an adequate heat sink and resulted in high heat buildup in the laser rod.

A solution is provided by the present invention in a laser that incorporates a semielliptical pump cavity that focuses pump energy from a linear pumping lamp on a laser rod that is in thermal contact with a heat sink. The high pumping efficiency of the invention is attained through the utilization of the highly specularly reflective surface of the semielliptical pump cavity that defines two parallel focal lines in a plane including the major axis of the semielliptical configuration. Excellent thermal control of the laser rod and the pumping lamp is provided by disposing these elements coaxially with respective ones of the parallel focal lines and in good thermal contact with the same heat sink or mutually insulated heat sinks.

Accordingly, it is an object of the present invention to provide a laser employing an improved pump cavity structure for focusing optical pump energy radiation from a linear pumping lamp at a solid-state active laser rod.

It is another object of the invention to provide a laser having both high optical pumping efficiency and good control of the heat generated in the pumping lamp and the active laser rod incorporated therein.

It is still another object of the invention to provide a laser having a compract pump focusing configuration and conductive type thermal control of the pumping lamp and laser rod to thereby reduce the package size of the device.

The invention and specific embodiments thereof will be described hereinafter by way of example and with reference to the accompanying drawing wherein like reference numerals refer to like elements or parts, and in which:

FIG. 1 is a perspective view of a laser constructed according to the invention;

FIG. 2 is a sectional view taken at any convenient position along the length of the embodiment shown in FIG. 1;

FIG. 3 is a sectional-type view of another embodiment of the invention having mutually insulative heat sink portions;

FIG. 4 is a sectional-type view of still another embodiment of the invention; and FIG. 5 illustrates a cross-section of yet another embodiment of the invention.

With reference now to the drawing and more particularly to FIGS. 1 and 2, there is shown a laser 11 according to the invention employing a pump cavity structure 13 of aluminum, for example, for focusing optical frequency pump energy radiation from a conventional linear pumping lamp 15 (which may be connected by electrodes 16 to an appropriate source of energy) at a solid-state active laser rod 17, for example, pink ruby. For laser regeneration within the laser rod 17, reflectors or silvered mirrors 19 (only one shown) are provided, in this case attached or plated to the ends of the rod 17. However, detached reflectors may also be utilized if desired. In order to provide an output from the device, at least one of the mirrors 19 should be partially transmissive at the frequency of the laser beam output as generated within the laser rod 17. As an alternative of this scheme (but not shown), in the case where at least one of the two reflectors are detached from the end of the active laser rod 17, some type of beam diverting member may be interposed between a detached reflector and the adjacent end of the laser rod that is adapted to divert a portion of the generated laser energy along a line that is not parallel to the path of the regenerative energy.

For efficient pumping of the laser rod 17 by the pumping lamp 15, the pump cavity structure 13 is provided with a first pump cavity body section 21 having a longitudinal and highly specularly reflective (polished for example) semielliptical surface 23 between its extremities 23a and 23b, which surface defines two parallel focal lines as indicated for purposes of description as points 25 in FIG. 2. These lines lie in a plane including the major axis (not shown) of the semielliptical surface 23.

To provide good thermal control of the laser rod 17 and the pumping lamp 15, the pump cavity structure 13 also is provided with a second pump cavity body section 27 having relatively high thermal conducting characteristics, such as provided by aluminum for example, disposed adjacent the first body section 21 to enclose the semielliptical surface 23 along the extremities thereof (23a and 23b) parallel to its longitudinal dimension. The second body section 27 has an inner surface adapted to receive in thermal contact both the pumping lamp 15 and the laser rod 17 in positions each substantially coaxial with respective ones of said focal lines as indicated by points 25.

According to the embodiment of FIGS. 1 and 2, the inner surface of the second body section 27 is shown as a flat surface 31 having two parallel grooves 33 disposed symmetrically about the two focal lines. The lamp 15 and rod 17 are maintained in thermal contact with the surface 31 and particularly the groove portions thereof by any convenient means such as tie down wires 35 that may be spot welded or otherwise attached to the second body section 27.

The semielliptical pump cavity configuration described provides substantially the equivalent function and advantages with regard to the focusing of pumping energy as does a conventional full elliptical cavity but in only one-half the volume. It turns out that where a semielliptical cavity is used, which is essentially one half of a complete elliptical cavity divided symmetrically along a plane including the major axis of the elliptical cross-section, substantially all the light generated by a pumping lamp situated along one of the focal lines defined by the semielliptical surface is directed to an active laser rod disposed along the other focal line either by reflection from the curved surface or directly. In order to increase the efficiency even higher, the grooved portions in contact with the lamp and rod may be caused to be highly specularly reflective either by polishing or by the plating of an appropriate material on the surface. Thus, the grooved portions 33 of the surface 31 may be highly polished or plated with silver, for example, and/or silicone grease coated thereon before positioning the lamp 15 and the laser rod 17 in place.

In the case where a greater amount of control is desired over the temperature of operation of the lamp and the laser rod as in the case of a high power laser and/or high repetition rate of a pulsed laser, the embodiment of the invention as illustrated in FIG. 3 may be used. Essentially, this configuration is the same as shown in FIGS. 1 and 2 but the second pump cavity body section 27 is provided with two mutually insulative portions 51 and 53 separated by a thermally insulative material 55 such as air or nylon, for example.

A further embodiment of the invention where a greater degree of direct illumination of the laser rod is provided as shown in FIG. 4. Here, the second pump cavity body section 27 is provided with a depressed portion 61 extending between the positions of the pumping lamp 15 and the rod 17. Of course, this configuration provides less direct thermal contact between the lamp and rod and the body section 27 which acts as a heat sink, but the illumination efficiency is somewhat increased as at least partial compensation. Again, the area of the surface of the heat sink in contact with the lamp and laser rod may be made more spectrally reflective by polishing, coating, etc.

It has been found that since the semielliptical surface 23 of the first pump cavity body section 21 conducts relatively little heat because it is highly reflective and absorbs energy to only a very limited degree, it need not act as a heat sink and can therefore be fabricated from sheet materials such as stainless steel or sheet aluminum 71 formed to provide a semielliptical surface 23 as seen in FIG. 5. It may be convenient in this case to secure this light weight curved section to the second body section 27 by means of machine screws 73, for example. An alternative to the simple tiedown method shown in the other embodiments is shown in FIG. 5. This method incorporates a moveable clamping member 75 adapted to clamp the laser rod 17 between itself and the second body section 27 when an appropriate machine screw (not shown) disposed in a hole 77 is screwed into a threaded portion 79. The contact on the rod 17 may be as much as 200° without appreciable loss of pumping efficiency.

In practicing the invention solid-state active laser materials other than ruby may be substituted for the ruby crystal described above, and other types of linear pumping lamps may be substituted for the xenon lamp shown in the drawing. Also, other similar materials may be substituted for the aluminum specified such as stainless steel. Furthermore, the two sections of the pump body structure 13 may be held in contact by any conventional means such as machine screws, etc., or these portions may be thermally insulated from each other by placing thin slabs of insulating material between these two portions.

From the foregoing, it will be evident that the invention provides an improved and highly efficient laser employing a pump cavity structure for focusing optical frequency pump energy radiation from a linear pumping lamp at a solid-state active laser rod.

Although specific embodiments of the invention have been described in detail, other organizations of the embodiments shown may be made within the spirit and scope of the invention.

Accordingly, it is intended that the foregoing disclosure and drawing shall be considered only as illustrations of the principles of this invention and are not to be construed in a limiting sense.

What is claimed is:

1. A laser employing a pump cavity structure for focusing optical frequency pump energy radiation from a linear pumping lamp at a solid-state active laser rod, comprising:
  (a) reflecting means disposed in a relationship to the ends of said laser rod to reflect laser energy therethrough essentially parallel to the longitudinal axis of said laser rod within said laser rod, said reflecting means being adapted to provide an output from said laser;
  (b) a first pump cavity body section having a longitudinal and highly specularly reflective semielliptical surface which defines two parallel focal lines in a pane including the major axis of said semielliptical surface;
  (c) a second pump cavity body section having relatively high thermal conducting characteristics adjacent said first body section to enclose said semielliptical surface along the extremities thereof parallel to its longitudinal dimension, said second body section having an inner surface adapted to receive in thermal contact respective ones of said pumping lamp and said laser rod in positions each substantially coaxial with respective ones of said two focal lines; and
  (d) means for maintaining said pumping lamp and said laser rod in said thermal contact with said inner surface of said second body section.

2. A laser employing a pump cavity structure for focusing optical frequency pump energy radiation from a linear pumping lamp at a solid-state active laser rod, comprising:
  (a) reflecting means disposed in a relationship to the ends of said laser rod to reflect laser energy therethrough essentially parallel to the longitudinal axis of said laser rod within said laser rod, said reflecting means being adapted to provide an output from said laser;
  (b) a first pump cavity body section having a longitudinal and highly specularly reflective semielliptical surface which defines two parallel focal lines in a plane including the major axis of said semielliptical surface;
  (c) a second pump cavity body section having relatively high thermal conducting characteristics adjacent said first body section to enclose said semielliptical surface along the extremities thereof parallel to its longitudinal dimension, said second body section having a flat inner surface wherein two longitudinal grooves are disposed that are adapted to receive in thermal contact respective ones of said pumping lamp and said laser rod in positions each substantially coaxial with respective ones of said two focal lines; and
  (d) means for maintaining said pumping lamp and said laser rod in said thermal contact with the surface of said grooves.

3. A laser pump cavity structure as claimed in claim 2, wherein the surfaces of said grooves are highly specularly reflective.

4. A laser employing a pump cavity structure for focusing optical frequency pump energy radiation from a linear pumping lamp at a solid-state active laser rod, comprising:
  (a) reflecting means disposed in a relationship to the ends of said laser rod to reflect laser energy therethrough essentially parallel to the longitudinal axis of said laser rod within said laser rod, said reflecting means being adapted to provide an output from said laser;
  (b) a first pump cavity body section having a longitudinal and highly specularly reflective semielliptical surface which defines two parallel focal lines in a plane including the major axis of said semielliptical surface;
  (c) a second pump cavity body section having relatively high thermal conducting characteristics adjacent said first body section to enclose said semielliptical surface along the extremities thereof parallel to its longitudinal dimension, said second body section having a flat inner surface wherein two longitudinal grooves are disposed that are adapted to receive in thermal contact respective ones of said pumping lamp and said laser rod in positions each substantially coaxial with respective ones of said two focal lines, said second body section comprising two thermal conducting portions thermally insulated from each other, each portion carrying different ones of said grooves; and
  (d) means for maintaining said pumping lamp and said laser rod in said thermal contact with the surfaces of said grooves.

5. A laser pump cavity structure as claimed in claim 4, wherein the surface of said grooves are highly specularly reflective.

6. A laser employing a pump cavity structure for focusing optical frequency pump energy radiation from a linear pumping lamp at a solid-state active laser rod, comprising:
  (a) reflecting means disposed in a relationship to the ends of said laser rod to reflect laser energy therethrough essentially parallel to the longitudinal axis of said laser rod within said laser rod, said reflecting means being adapted to provide an output from said laser;
  (b) a first pump cavity body section having a longitudinal and highly specularly reflective semielliptical surface which defines two parallel focal lines in a plane including the major axis of said semielliptical surface;
  (c) a second pump cavity body section having relatively high thermal conducting characteristics adjacent said first body section to enclose said semielliptical surface along the extremities thereof parallel to its longitudinal dimension, said second body section having a highly specularly reflective inner surface wherein a trough is disposed that is adapted to receive in thermal contact said pumping lamp and said laser rod at opposite sides thereof and in positions each substantially coaxial with respective ones of said two focal lines; and
  (d) means for maintaining said pumping lamp and said laser rod in said thermal contact with the surface of said trough.

7. A laser pump cavity structure for focusing optical frequency pump energy radiation from a linear pumping lamp at a solid-state active laser rod, comprising:
  (a) a first pump cavity body section having a longitudinal and highly specularly reflective semielliptical surface which defines two parallel focal lines in a plane including the major axis of said semielliptical surface;
  (b) a second pump cavity body section having relatively high thermal conducting characteristics adjacent said first body section to enclose said semielliptical surface along the extremities thereof parallel to its longitudinal dimension, said second body section having an inner surface adapted to receive in thermal contact respective ones of said pumping lamp and said laser rod in positions each substantially coaxial with respective ones of said two focal lines; and
  (c) means for maintaining said pumping lamp and said laser rod in said thermal contact with said inner surface of said second body section.

8. A laser pump cavity structure for focusing optical frequency pump energy radiation from a linear pumping lamp at a solid-state active laser rod, comprising:
  (a) a first pump cavity body section having a longitudinal and highly specularly reflective semielliptical surface which defines two parallel focal lines in a plane including the major axis of said semielliptical surface;
  (b) a second pump cavity body section having relatively high thermal conducting characteristics adjacent said first body section to enclose said semielliptical surface along the extremities thereof parallel to its longitudinal dimension, said second body section having a flat inner surface wherein two longitudinal grooves are disposed that are adapted to receive in thermal contact respective ones of said pumping lamp and said laser rod in positions each substantially coaxial with respective ones of said two focal lines; and (c) means for maintaining said pumping lamp and said laser rod in said thermal contact with the surface of said grooves.

9. A laser pump cavity structure for focusing optical frequency pump energy radiation from a linear pumping lamp at a solid-state active laser rod, comprising:

(a) a first pump cavity body section having a longitudinal and highly specularly reflective semielliptical surface which defines two parallel focal lines in a plane including the major axis of said semielliptical surface;

(b) a second pump cavity body section having relatively high thermal conducting characteristics adjacent said first body section to enclose said semielliptical surface along the extremities thereof parallel to its longitudinal dimension, said second body section having a flat inner surface wherein two longitudinal grooves are disposed that are adapted to receive in thermal contact respective ones of said pumping lamp and said laser rod in positions each substantially coaxial with respective ones of said two focal lines, said second body section comprising two thermal conducting portions thermally insulated from each other, each portion carrying different ones of said grooves; and (c) means for maintaining said pumping lamp and said laser rod in said thermal contact with the surfaces of said grooves.

10. A laser pump cavity structure for focusing optical frequency pump energy radiation from a linear pumping lamp at a solid-state active laser rod, comprising:

(a) a first pump cavity body section having a longitudinal and highly specularly reflective semielliptical surface which defines two parallel focal lines in a plane including the major axis of said semielliptical surface;

(b) a second pump cavity body section having relatively high thermal conducting characteristics adjacent said first body section to enclose said semielliptical surface along the extremities thereof parallel to its longitudinal dimension, said second body section having a highly specularly reflective inner surface wherein a trough is disposed that is adapted to receive in thermal contact said pumping lamp and said laser rod at opposite sides thereof and in positions each substantially coaxial with respective ones of said two focal lines; and (c) means for maintaining said pumping lamp and said laser rod in said thermal contact with the surface of said trough.

References Cited

UNITED STATES PATENTS 3,327,243 6/1967 Stickley _____ 331—94.5
3,355,674 11/1967 Hardy _____ 331—94.5

ROY LAKE, Primary Examiner

SIEGFRIED H. GRIMM, Assistant Examiner

U.S. Cl. X.R.

330—4.3